United States Patent

Bergamo

[11] Patent Number: 5,098,499
[45] Date of Patent: Mar. 24, 1992

[54] METHOD FOR FORMING SURFACE-ENGRAVED PANELS CLAD WITH A SHEET OF THERMODEFORMABLE MATERIAL AND APPARATUS FOR IMPLEMENTING THE METHOD

[76] Inventor: Luciano Bergamo, Via delle Industrie, 5, I-31040 Salgareda, Italy

[21] Appl. No.: 328,037
[22] PCT Filed: Jul. 29, 1987
[86] PCT No.: PCT/EP87/00412
§ 371 Date: Feb. 1, 1989
§ 102(e) Date: Feb. 1, 1989
[87] PCT Pub. No.: WO88/00880
PCT Pub. Date: Feb. 11, 1988

[30] Foreign Application Priority Data
Aug. 1, 1986 [IT] Italy .................... 84134 A/86

[51] Int. Cl.⁵ ................................... B32B 31/00
[52] U.S. Cl. ........................... 156/209; 156/212; 156/220; 156/221; 156/555; 156/312; 156/582
[58] Field of Search ............... 156/555, 582, 220, 312, 156/209, 212, 221; 425/367, 368, 363; 428/161, 542.2, 323

[56] References Cited

U.S. PATENT DOCUMENTS

| | | | |
|---|---|---|---|
| 2,673,168 | 3/1954 | Pascoe et al. | 156/582 X |
| 2,685,548 | 8/1954 | Drozdowski | 156/582 X |
| 2,723,931 | 11/1955 | Mercer | 156/582 X |
| 3,540,960 | 11/1970 | Widigs | 156/209 X |
| 3,793,125 | 2/1974 | Kunz | 156/220 X |
| 3,846,219 | 11/1974 | Kunz | 156/220 X |
| 3,994,769 | 11/1976 | Gersbeck | 156/555 X |
| 4,327,634 | 5/1982 | Colmon et al. | 156/582 X |
| 4,542,691 | 9/1985 | Kokrhanek | 101/27 X |
| 4,788,911 | 12/1988 | Bishop et al. | 156/582 X |

FOREIGN PATENT DOCUMENTS

| | | | |
|---|---|---|---|
| 2731657 | 1/1979 | Fed. Rep. of Germany . | |
| 962029 | 9/1982 | U.S.S.R. | 156/312 |
| 973400 | 11/1982 | U.S.S.R. | 425/368 |
| 220766 | 8/1924 | United Kingdom . | |

Primary Examiner—Michael W. Ball
Assistant Examiner—Jeff H. Aftergut
Attorney, Agent, or Firm—Hoffman, Wasson & Gitler

[57] ABSTRACT

The method for forming surface-engraved panels clad with a sheet of thermodeformable material, particularly PVC, comprises a preliminary stage of engraving the surface of a chipboard substrate to obtain cavities therein in accordance with a predetermined design, and a subsequent stage in which an adhesive is spread over said surface followed by a sheet of thermodeformable material which covers said cavities, and is characterized in that the panel (6) prepared in this manner is passed through at least one pair of rollers (7,8), of which the roller (8) in contact with said surface is formed of elastically yieldable material which causes the sheet of thermodeformable material, previously heated until soft, to penetrate into said cavities.

5 Claims, 3 Drawing Sheets

METHOD FOR FORMING SURFACE-ENGRAVED PANELS CLAD WITH A SHEET OF THERMODEFORMABLE MATERIAL AND APPARATUS FOR IMPLEMENTING THE METHOD

This invention relates to a method for forming surface-engraved panels clad with a sheet of thermodeformable material, and an apparatus for implementing the method.

Methods are known for forming surface-engraved panels clad with a deformable material sheet.

One of these methods comprises a first stage in which a surface of the panel, generally in the form of a chipboard substrate, is engraved in order to form personalized effects and designs on it accordance with the client's requirements. Over said surface a layer of glue is then spread, on which a sheet of PVC or other thermodeformable material is then applied.

The assembly is then subjected to the action of a press, the punch of which has a shape complementary to that of the engraved panel. The press acts under hot conditions on the PVC sheet to thus cause it do adhere to the cavities in the chipboard substrate.

However, this known method has certain drawbacks, and in particular:
 the need to correctly position the panel relative to the punch,
 the need for different punches corresponding to the different design to be formed,
 a considerable time wastage due both to the need to replace the punch every time the decorative panel motif changes, and to the laboriousness of this replacement operation. In this respect, in order to replace the punch it first has to be cooled, and after being replaced it then has to be raised to the working temperature in order to be able to again use it.

To obviate these drawbacks, another method has already been proposed in which the stages involving the engraving of the chipboard substrate and the application of the thermodeformable material remain unchanged, but in which the panel is subject to the action of a hot press, the fixed plate of which is in the form of a chamber filled with a fluid and having that surface in contact with the panel formed from a deformable elastic membrane. By virtue of the pressure and temperature increase of the fluid contained in the chamber, the membrane deforms by expanding, to cause the thermodeformable material to penetrate into the cavities previously formed in the chipboard substrate.

This known method, which enables the same punch to be used for all types of design, has however other drawbacks, and in particular:
 if the membrane is of a thin type, it is impossible to attain high pressure and thus impossible to obtain sufficient deformation in the case of cavities of a certain depth; in any event, the membrane undergoes stretching and is therefore subject to frequent rupture,
 if the membrane is of greater thickness it adheres poorly to the cavity walls, and consequently results in an unfaithful reproduction of the design,
 its application is limited due to the maximum attainable pressure and temperature. In this respect, if the chamber fluid is water, it is obviously impossible to operate at a temperature exceeding 100° C. If however the fluid is a diathermic oil, not only does the membrane disintegrate at the high temperature but the oil reacts chemically with it.

DE-A-2 731 657 relates to a machine for cladding a workpiece with a sheet of thermodeformable material, which comprises a plurality of pairs of rollers between which the panel to be treated is passed, the roller of the pair in contact with the panel surface to be treated being formed of elastically yieldable material, and means for heating the panel surface to be treated before its passage between the pair of rollers.

A drawback of this machine consists in that it allows to only clad flat surface panels.

The object of the invention is to obviate all these drawbacks and to produce surface-engraved panels clad with thermodeformable material, in a rapid, reliable and versatile manner.

This object is attained according to the invention by a method for forming surface-engraved panels clad with a sheet of thermodeformable material, particularly PVC, comprising a preliminary stage of engraving the surface of a chipboard substrate to obtain cavities therein in accordance with a predetermined design, a stage in which a thermosoftenable adhesive is spread over said surface, a stage in which further thermosoftenable adhesive is spread on a sheet of thermodeformable material, and a stage in which said sheet of thermodeformable material is applied to the surface of the chipboard substrate provided with said cavities, characterised in that the panel prepared in this manner is heated to obtain the partial softening of the sheet of thermodeformable material and the softening of the adhesive connected with the cavities and in that the panel is subsequently passed through at least one pair of rollers, of which the roller in contact with the surface provided with cavities is formed of elastically yieldable material which causes the sheet of thermodeformable material, already softened, to penetrate into said cavities as far as to adhere to their surface.

The present invention is hereinafter further clarified in a preferred embodiment with reference to the accompanying drawings in which.

Figure 1:
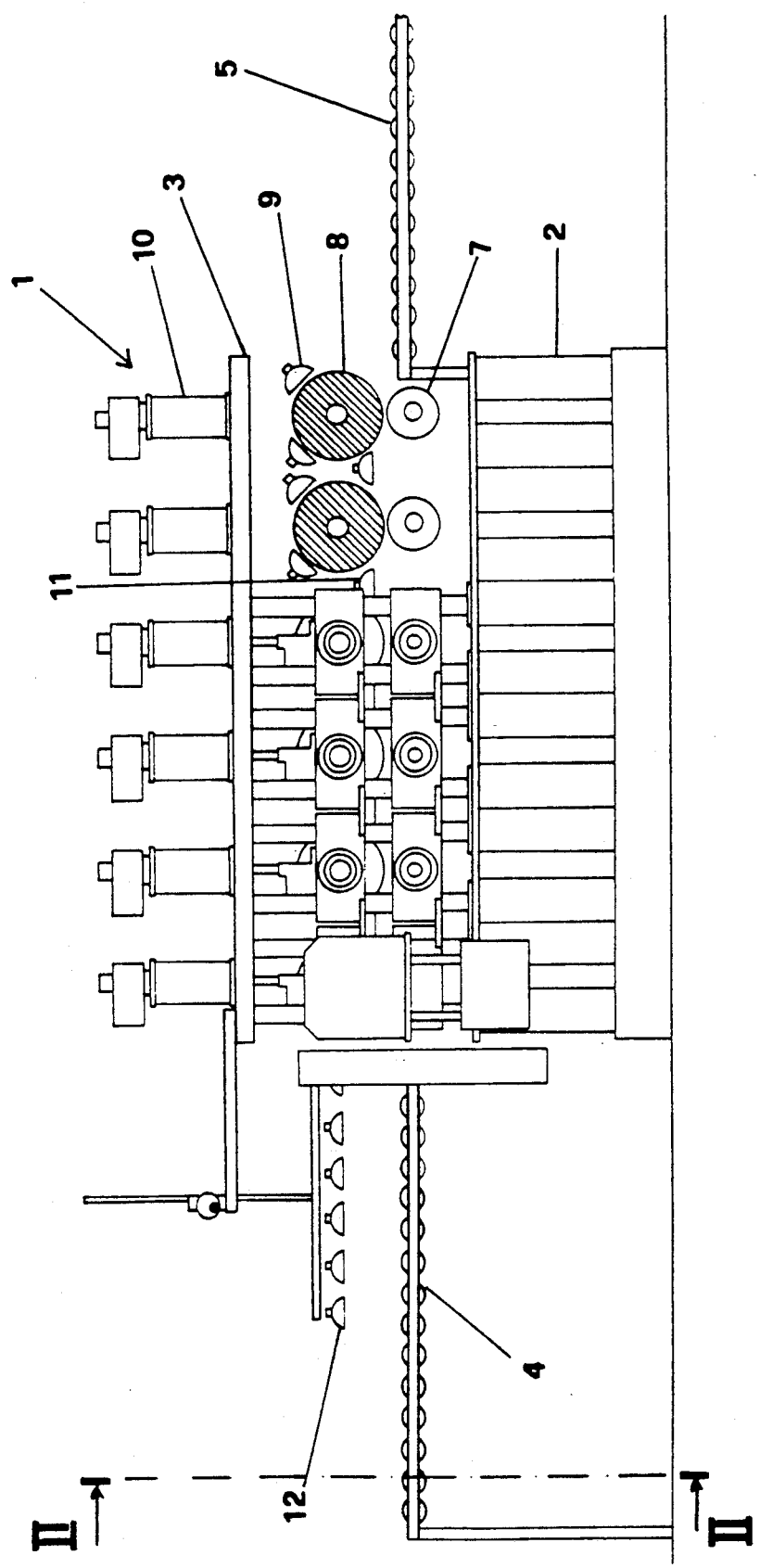
FIG. 1 is a partly sectional diagrammatic side view of a machine for implementing the method according to the invention.
Figure 2:
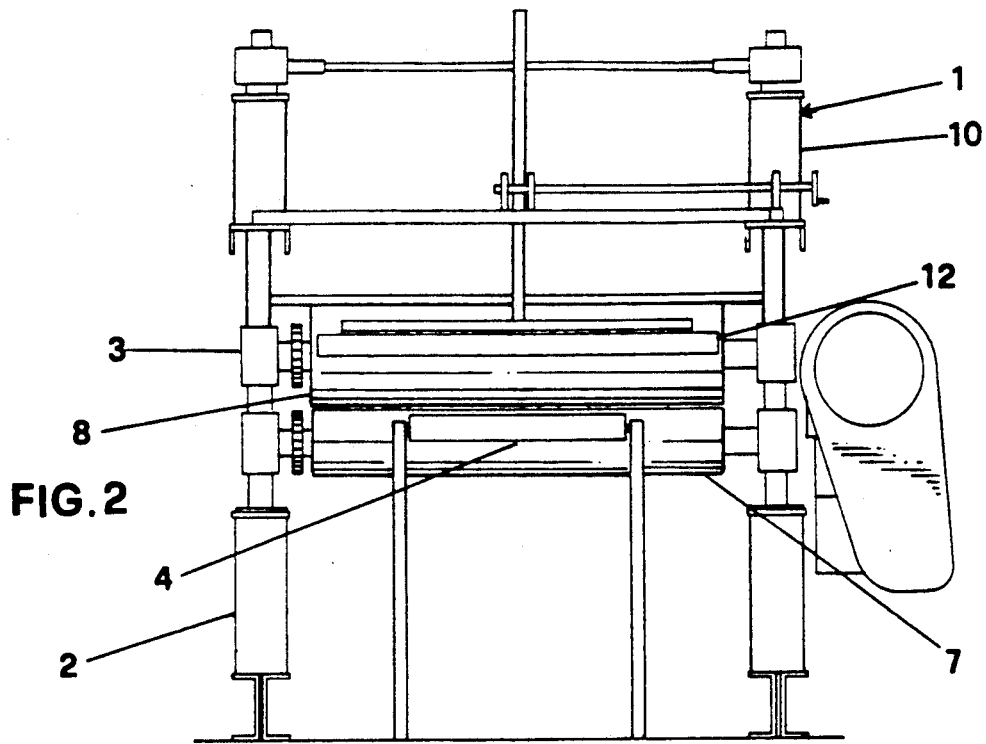
FIG. 2 is a front view thereof on the inlet side in the direction II-II of FIG. 1.
Figure 3:
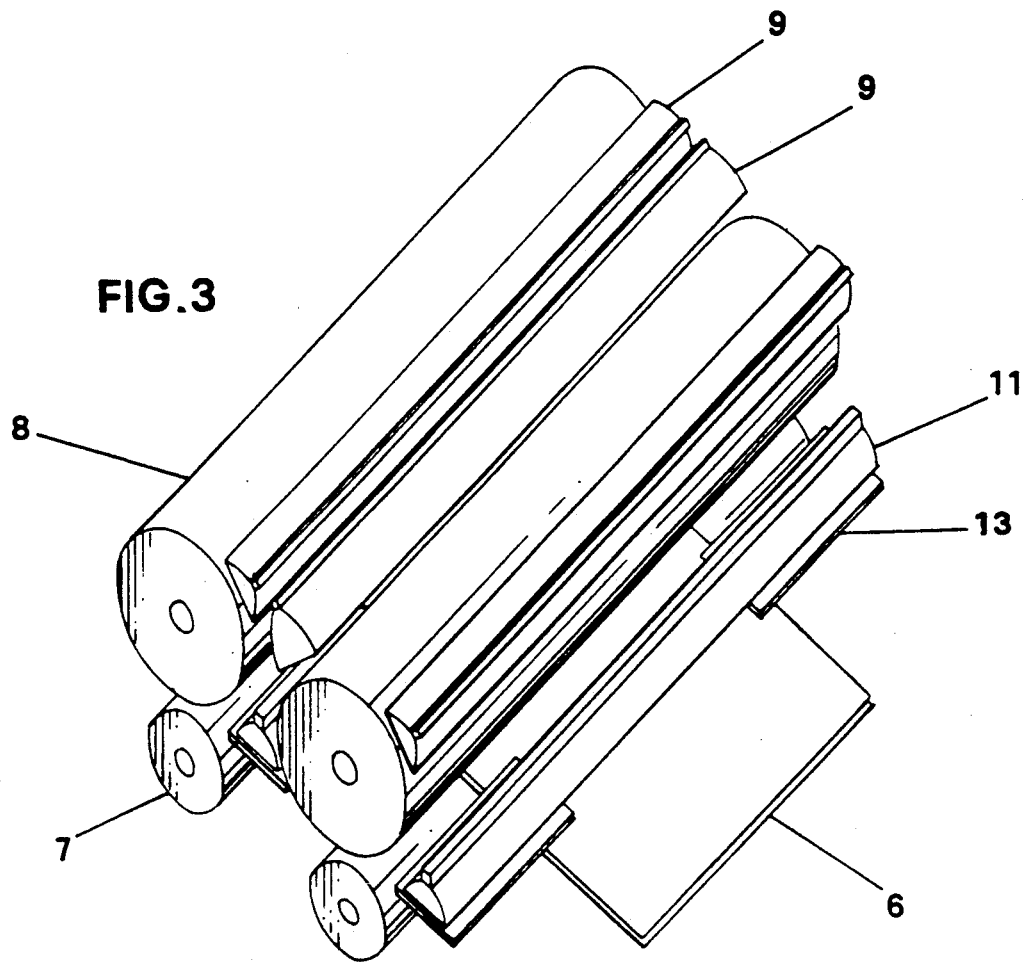
FIG. 3 is an enlarged detailed perspective view of two adjacent pairs of rollers and the corresponding heater elements.

As can be seen from the figures, the machine for implementing the method according to the invention consists essentially of a continuous press 1 comprising a fixed lower bed 2 and a mobile upper structure 3.

At both ends of the press 1 there are provided conventional roller tables 4 and 5 for feeding and discharging the panels 6 respectively.

A plurality of synchronously operates steel rollers 7 are mounted on the bed 2. Six rollers 7 are shown in the illustrated machine.

The mobile upper structure 3 consists of a support frame for a like number of rollers 8 disposed parallel to the rollers 7 and facing these latter.

The height of the frame 3 above the bed 2 can be adjusted by pneumatic cylinder-piston units 10.

The rollers 8 are constructed of rubber of differing hardness which increase from the inlet end roller to the outlet and roller of the press. In the illustrated example, the hardness of the inlet roller 8 is about 18° Shore, and the hardness of the outlet roller is about 40° Shore, although these values can vary between 10° Shore and 45° Shore according to the materials to be treated and the work to be carried out.

Above the frame 3 and facing each roller 8 there are provided pairs of radiant heater elements 9 disposed transversely to the press and extending over the entire length of the corresponding rollers 8.

Between each pair of rollers 7, 8 and the adjacent pair there are also provided other radiant heater elements 11 secured to the frame 3 and disposed parallel to the heater elements 9.

Finally, other radiant heater elements 12 are provided above the feed roller table 4.

All the heater elements 9, 11 and 12 are adjustable in height and are provided with known potentiometric devices which enable their intensity to be varied.

The machine according to the invention operates in the following manner:
the height of the upper mobile structure 3 above the bed 2 is adjusted so that the minimum distance between the rollers 7, 8 of each pair is slightly less than the minimum thickness of the panels 6 to be treated, as measured at their cavities or grooves. The height and/or intensity of the heater elements 9, 11 and 12 are then adjusted in such a manner as to obtain increasing temperature both along the roller table 4 and along the press 1. More specifically:
the intensity of the heater elements 12 is adjusted in such a manner that the temperature along the roller table 4 increases progressively from ambient to about 30°-40° C. at the pair of inlet rollers of the press 1;
the intensity of the heater elements 9 and 11 is adjusted in such a manner that the temperature at the surface of the rollers 8 and within the press 1 increases progressively from a value of 30°-40° C. at the inlet roller to a value of about 120° C. at the outlet roller.

The temperature conditions are obviously related to the nature of the cladding material, although in all cases the outlet temperature of the roller table 4 must substantially correspond to the inlet temperature of the press 1 to prevent the adhesive and cladding undergoing undesirable thermal shock.

When the machine has been arranged in this manner, the panels 6 to be treated consisting of a chipboard support, to the engraved surface of which there has previously been bonded a sheet of PVC or other thermodeformable material, are disposed on the roller table 4 and fed to the press 1. During this stage the preheating of that panel surface facing the heater elements 12 results in partial softening of said cladding layer and the softening of the adhesive which binds the cladding layer to the chipboard substrate.

As the panel 6 advance along the press 1, the combined effect of the temperature, which increases progressively during passage between the adjacent pairs of rollers 7, 8 and softens the PVC sheet together with the pressure exerted by the rollers 8, which press with their rubber surface against said softened cladding until they cause it to penetrate into the cavities in the underlying chipboard substrate, is such as to perfectly and faithfully clad the panel surface.

This operation is also effected gradually because of the progressively increasing hardness of the rubber of the rollers 8 which enables the pressure on the cladding material to be increased while maintaining the pressure with which the upper structure 3 is pressed by the cylinder-piston units 10 against the bed constant.

From the aforegoing it is apparent that the method for forming surface-engraved panels according to the invention and the machine for implementing the method enable numerous advantages to be obtained and in particular:
  they obviate the need for presses with punches, together with all their related drawbacks,
  they enable panels engraved with any design to be treated,
  because of the hardness and elasticity of the rubber layer of the rollers 8, they enable this layer to completely penetrate into the cavities formed in the chipboard substrate, with consequent faithful design reproduction,
  they allow continuous working.

Figure 4:
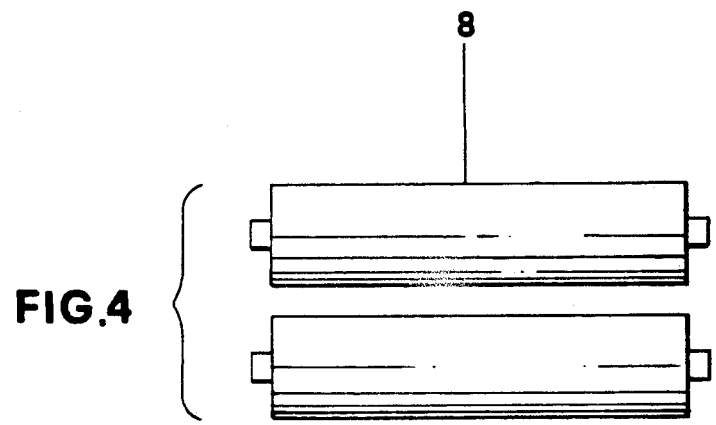
FIG. 4 is a diagrammatic plan view of a pair of adjacent presser rollers.
Figure 5:
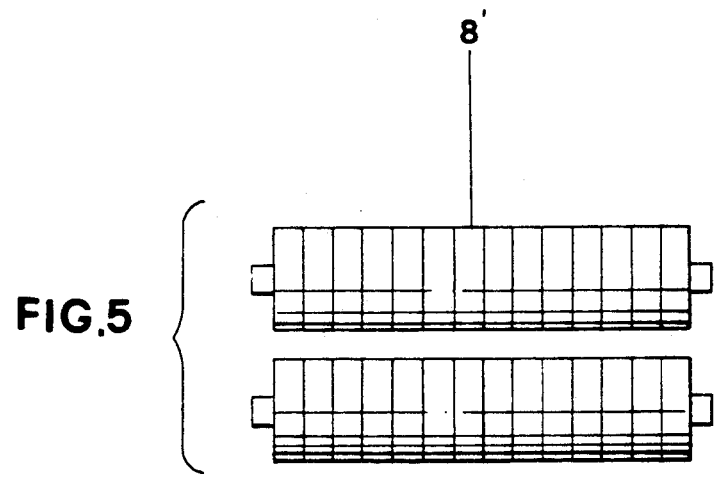
FIG. 5 is a plan view from above of a modified embodiment of a pair of adjacent rollers.
Figure 6:
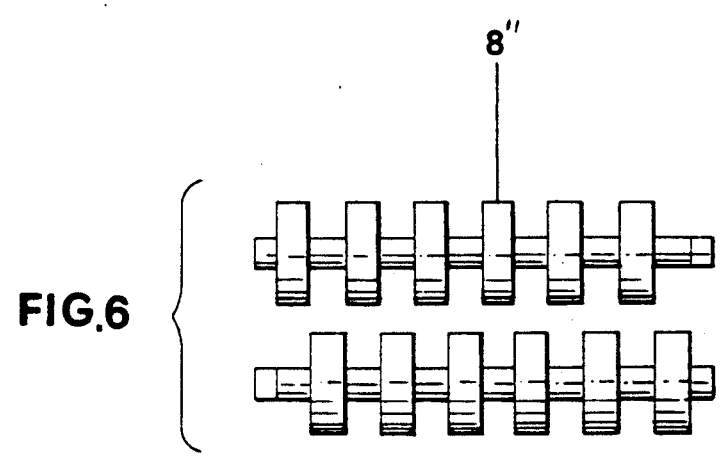
FIG. 6 is a plan view from above of a further modified embodiment of a pair of adjacent presser rollers.

In a further embodiment the machine according to the invention has its upper rollers of rubber, and these instead of being constructed in one piece (see the rollers 8 in FIG. 4) are constructed as a plurality of segments, which allow greater penetration in the case of panels with very deep cavities. These segments can be arranged either side-by-side with each other (see the rollers 8' in FIG. 5) or spaced apart, in which case they are offset from the segments of the adjacent roller (see the rollers 8" in FIG. 6).

As it is often necessary to limit the heating effect of the heater elements 11 to only the width of the chipboard substrate without heating that cladding portion which projects beyond this, according to the invention screens 13 of adjustable distance apart can be provided in correspondence with the heater elements 11 in order to limit the heating of the panels 6 by said heater elements 11 to the effective width of the panel 6.

I claim:

1. A method for forming surface-engraved panels clad with a sheet of thermodeformable material comprising:
  forming a panel by a preliminary stage of engraving a surface of a chipboard substrate to obtain cavities therein in accordance with a predetermined design, a stage in which a thermosoftenable adhesive is spread over said surface, a stage in which further thermosoftenable adhesive is spread on a sheet of thermodeformable material, and a stage in which said sheet of thermodeformable material is applied to the surface of the chipboard substrate provided with said cavities, wherein
  the panel thus prepared is heated by advancing it past heater elements to obtain partial softening of the sheet of thermodeformable material and softening of the thermosoftenable adhesive and wherein
  the panel is subsequently passed through at least one pair of rollers of which the roller in contact with the surface provided with cavities is formed of elastically yieldable material which causes the sheet of thermodeformable material, already softened, to penetrate into said cavities sufficiently far as to adhere to a surface of the cavities, wherein the heating of the panel is limited to only the engraved surface, its lateral edges being shielded by screens interposed between said heater elements and said panel.

2. A method for forming rigid substrate panels clad with a sheet of thermodeformable material, comprising the steps of:

engraving a surface of said substrate to obtain cavities therein according to a predetermined design, spreading a thermosoftenable adhesive over the entire engraved surface, including the cavities, of said substrate and to said sheet, applying said sheet of thermodeformable material to the engraved surface of the chipboard substrate, heating the assembled panel to partially soften said sheet of thermodeformable material covering said cavities and to soften the adhesive within said cavities, while shielding unengraved portions of said engraved surface from heating, and then passing the panel through one or more pairs of rollers formed of elastically yieldable material of which the roller in contact with the engraved surface causes the sheet of thermodeformable material, already softened, to penetrate into said cavities so as to adhere to their surfaces.

3. An apparatus for forming surface-engraved panels clad with a sheet of thermodeformable material, comprising:

a frame defining a flowpath for a series of panels, each having one engraved surface having cavities formed therein, and with unengraved portions, means for heating the engraved surface of the panel, to cause softening of both a sheet of thermodeformable material previously applied to said panel, and an adhesive within said cavities, a plurality of pairs of rollers between which the panel is passed, the roller of each pair in contact with the engraved surface being formed of an elastically yieldable material, and a plurality of heater elements for heating the surface of the panels and a surface of the rollers, said elements being interposed between successive rollers, one roller of each pair being mounted on fixed supports attached to said frame, and each roller acting on the engraved surface being mounted on supports which are movable with respect to the corresponding fixed supports, means for progressively heating the rollers acting on the engraved surface, so that the roller temperatures increase along said flowpath, and further comprising heat shields interposed between the heater elements and the panel to shield the unengraved portions of the panel surface.

4. An apparatus for forming surface-engraved panels clad with a sheet of thermodeformable material, comprising:

a frame defining a flowpath for a series of panels, each having one engraved surface having cavities formed therein, means for heating the engraved surface of the panel, to cause softening of both a sheet of thermodeformable material previously applied to said panel, and an adhesive within said cavities, a plurality of pairs of rollers between which the panel is passed, the roller of each pair in contact with the engraved surface being formed of an elastically yieldable material, and a plurality of heater elements for heating the surface of the panels and the surface of the rollers, said elements being interposed between successive rollers, one roller of each pair being mounted on fixed supports attached to said frame, and each roller acting on the engraved surface being mounted on supports which are movable with respect to the corresponding fixed supports, means for progressively heating the rollers acting on the engraved surface, so that the roller temperatures increase along said flowpath, the rollers acting on the engraved surface of the panels are formed of rubber having a hardness which increases progressively along said flowpath, from about 10° Shore to about 45° Shore.

5. The invention of claim 4, wherein said roller hardness increases progressively from about 18° Shore to about 40° Shore.

* * * * *